United States Patent [19]

Ichikawa et al.

[11] Patent Number: 5,698,068

[45] Date of Patent: Dec. 16, 1997

[54] THERMOCOMPRESSION BONDING EQUIPMENT

[75] Inventors: Iwao Ichikawa, Tokyo; Norio Kawatani, Kanagawa; Kazuaki Suzuki; Yukio Yamada, both of Tochigi, all of Japan

[73] Assignee: Sony Corporation, Tokyo, Japan

[21] Appl. No.: 429,695

[22] Filed: Apr. 27, 1995

[30] Foreign Application Priority Data

May 13, 1994 [JP] Japan .................. 6-124555

[51] Int. Cl.⁶ ..................... B30B 15/34
[52] U.S. Cl. ............... 156/581; 156/583.1; 156/583.91; 100/93 P; 228/180.21; 228/44.7
[58] Field of Search ................ 156/580, 581, 156/583.1, 583.91; 228/44.3, 44.7, 180.1, 180.21, 212; 100/93 P, 291, 292

[56] References Cited

U.S. PATENT DOCUMENTS

| | | | |
|---|---|---|---|
| 3,816,216 | 6/1974 | Takei | 156/583.91 |
| 4,472,235 | 9/1984 | Pasche et al. | 156/461 |
| 4,768,946 | 9/1988 | Maruyama et al. | 425/595 |
| 4,776,921 | 10/1988 | French | 156/581 |
| 4,954,206 | 9/1990 | Voss | 156/537 |
| 5,225,025 | 7/1993 | Lambing | 156/358 |
| 5,368,217 | 11/1994 | Simmons et al. | 228/6.2 |
| 5,439,161 | 8/1995 | Kawatani et al. | 228/180.21 |

Primary Examiner—James Sells
Attorney, Agent, or Firm—Ronald P. Kananen

[57] ABSTRACT

This invention provides a thermocompression bonding equipment which, when the material to be bonded is to be changed, allows easy replacement and preparation of a compression bonding head, reduction of working time required for replacement and preparation of a compression bonding head, and simplified adjustment of the compression bonding head. The thermocompression bonding equipment is provided with a head unit 20 comprising a base 10, thermocompression bonding head 56 and sliding mechanism 50 for sliding the thermocompression bonding head 56 provided on the base 10, pressing means 30, which are structured independently from the head unit, for pressing the sliding mechanism 50 to slide the thermocompression bonding head 56, thereby thermocompression bonding the material of ACF, LCD, and TAB, and a base frame 40 provided with positioning means 40, 41 for positioning the base 10.

11 Claims, 11 Drawing Sheets

THERMOCOMPRESSION BONDING EQUIPMENT

BACKGROUND OF THE INVENTION

1. Field of the Invention

The present invention relates to thermocompression bonding equipment for thermocompression bonding of a member on another member, and more particularly to a thermocompression bonding equipment for thermocompression bonding of electrode members of a liquid crystal panel to conductors such as TAB terminals provided apart with small spaces inserting an anisotropic conductive film therebetween.

2. Description of Related Art

Conventionally in the manufacturing process of a liquid crystal panel, a liquid crystal panel comprised of liquid crystal cells and so-called tape automated bonding (TAB) terminals comprised of integrated circuits for driving the liquid crystal cells are thermocompression-bonded with an insert of anisotropic conductive film (referred to as ACF hereinafter) comprising thermosetting resin in which conductive particles are dispersed to connect electrodes of a glass substrate of the liquid crystal panel and electrodes of the TAB terminal.

A TAB terminal comprises a base film of polyimide for example, a copper foil with circuit patterns adhered on the base film, and IC chips adhered on the circuit copper foil pattern. The TAB terminal of this structure is thermocompression-bonded with an insert of anisotropic conductive film (ACF). The thermocompression bonding equipment for thermocompression bonding work is constituted as described hereunder.

A compression bonding head for heating and compression bonding a TAB terminal is combined with a pressing unit for pressing the compression bonding head. The pressing unit may be joined to a compression bonding head with screws. Detaching a compression bonding head from a pressing unit is troublesome work. It takes a long time to adjust the flatness after a pressing unit and compression bonding head are combined or joined.

In the case of thermocompression bonding equipment provided with a plurality of compression bonding heads, each head is mounted for replacing. Each compression bonding head must be adjusted individually for flatness and pressure when installed or reinstalled.

When compression bonding heads of different types are combined or joined to a pressing unit corresponding to the shape and size of TAB terminals, the pressure of the compression bonding heads is changed. Therefore in this case, the pressing unit may need to be replaced to meet the required pressure.

For example in the case of six compression bonding heads (2 mm×35 mm), the pressing force is 168 kg for a pressure of 40 kg/cm², while in the case of one compression bonding head, the pressing force is 28 kg for the pressure of 40 kg/cm². The replacing of the pressing unit is required.

As described hereinbefore, it takes a very long time to adjust compression bonding heads after replacement when conventional thermocompression bonding equipment is used. The adjustment of a compression bonding head means the adjustment of pressure, flatness, and temperature.

Since a pressing unit and compression bonding heads are combined or joined in the conventional thermocompression bonding equipment, it is required to detach compression bonding heads from the pressing unit when compression bonding heads and the pressing unit are replaced.

In this case, a heavy compression bonding head is carried by several workers for replacing and therefore the workability is bad.

When a compression head is replaced, a driving unit of the pressing unit also must be replaced, otherwise, proper pressing force is not provided on the compression bonding head.

SUMMARY OF THE INVENTION

It is therefore the object of the present invention to provide thermocompression bonding equipment which enables replacement and adjustment of a compression bonding head easily, saving the time usually required for replacing and preparing a compression bonding head when the material to be thermocompression-bonded is changed. Thus the above mentioned problem is solved.

This object is attained, with respect to the first embodiment, by providing the thermocompression bonding equipment with a head unit having a base, thermocompression bonding heads, sliding mechanisms provided on the base for sliding the thermocompression bonding heads, pressing means which are an independent member from the head unit for pressing the sliding mechanisms to slide the thermocompression bonding heads and to thermocompression-bond the material to be bonded with the thermocompression bonding heads, and a base frame having positioning means for positioning the base.

In the case of the first embodiment, preferably a plurality of the thermocompression bonding heads are provided on the sliding mechanisms along the base.

For the first embodiment, preferably the material to be bonded comprises TAB terminals and electrodes of a liquid crystal panel and an anisotropic conductive film sandwiched between the terminals and the electrodes.

This object is attained, with respect to the second embodiment, by providing the thermocompression bonding equipment with a head unit having a base, thermocompression bonding heads, sliding mechanisms provided on the base for sliding the thermocompression bonding heads, pressing means which are an independent member from the head unit for pressing the sliding mechanisms to slide the thermocompression bonding heads and to thermocompression-bond the material to be bonded with the thermocompression bonding heads, a base frame having positioning means for positioning the base, and a waiting unit for keeping another head unit to be replaced with the head unit.

In the case of the second embodiment, preferably the head unit on the positioning means is replaceable with the head unit kept on the waiting means along a guide means.

In the case of the second embodiment, preferably a plurality of the thermocompression bonding heads are provided on the sliding mechanisms along the base. (In the case of the first embodiment, preferably a plurality of the thermocompression bonding heads provided on the sliding mechanisms are provided along the base.)

For the second embodiment, preferably the material to be bonded are TAB terminals and electrodes of a liquid crystal panel with an insert of anisotropic conductive film.

As the thermocompression bonding equipment of the present invention is constituted as described hereinabove, by operating the pressing means, which is constituted independently from the head unit, having the base, thermocompression bonding heads, and sliding mechanisms, the sliding mechanisms are pressed to slide the thermocompression bonding heads, and the thermocompression bonding heads thermocompression-bond the material to be bonded.

The head unit constituted independently from the pressing means is replaceable for another head unit so as to suit to the material to be bonded.

Positioning means are provided to position the replaced head unit correctly, that is, the base of the replaced head unit is positioned correctly to the base frame by aid of the positioning means of the base frame.

Waiting means are provided to keep another head unit for replacing, that is, another head unit is being kept on the waiting means for replacing and when another material is to be bonded, the head unit currently being used is replaced for another head unit suitable for another material to be bonded next.

DETAILED DESCRIPTION OF THE PREFERRED EMBODIMENTS

Preferred embodiments of the present invention will be described in detail referring to the attached drawings.

The embodiments described hereinafter are preferred embodiments of the present invention technically specified, however the scope of the invention by no means limited by any of the details of the embodiments.

Figure 1:
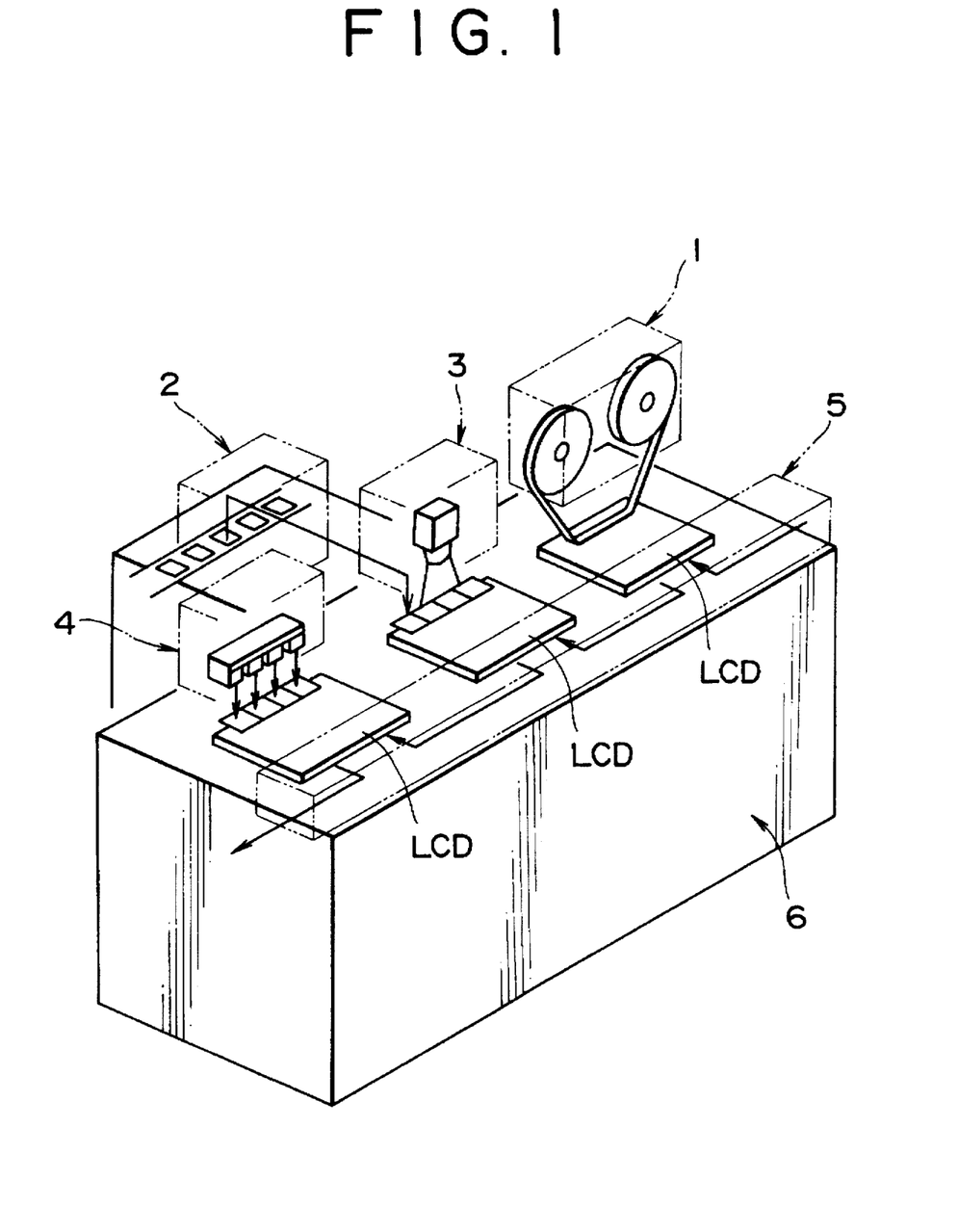
FIG. 1 is an overview of the thermocompression bonding system illustrating a preferred embodiment of a thermocompression bonding equipment in accordance with the present invention.

FIG. 1 illustrates a thermocompression bonding system provided with a preferred embodiment of the thermocompression bonding equipment in accordance with the present invention.

The thermocompression bonding system in FIG. 1 is provided with following elements.

The ACF (anisotropic conductive film) feeding unit 1 is a feeding unit for feeding anisotropic conductive film ACF to thermocompression-bond anisotropic conductive film ACF on liquid crystal panels LCD continuously.

The feeding unit 2 of the TAB terminal is a unit for feeding image processing of TAB terminal, tray, or tape.

The mounting unit 3 of the TAB terminals is a unit for image processing of a liquid panel LCD, namely liquid crystal display, correction of TAB terminal position, or temporary bonding.

The thermocompression bonding equipment 4 for final bonding TAB terminals to a liquid crystal panel LCD is served for thermal setting of an isotropic film ACF and electric connection of a liquid crystal panel LCD to TAB terminals.

The conveyance unit 5 is a unit for suction-conveying liquid crystal panels LCD. The controlling/frame unit 6 is a member for controlling the system integrally.

Figure 2:
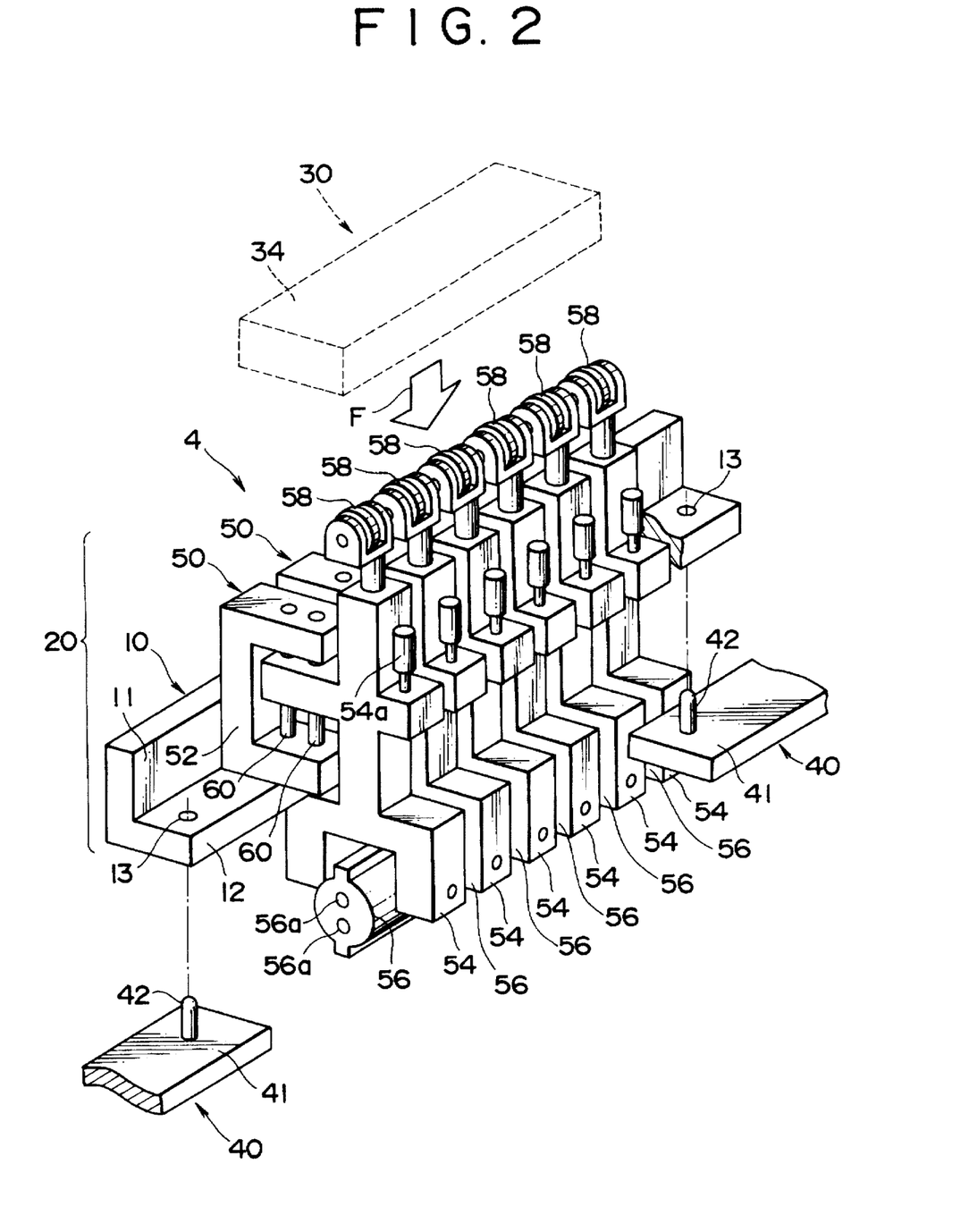
FIG. 2 is a perspective view for illustrating a preferred embodiment of the thermocompression bonding equipment in FIG. 1.
Figure 3:
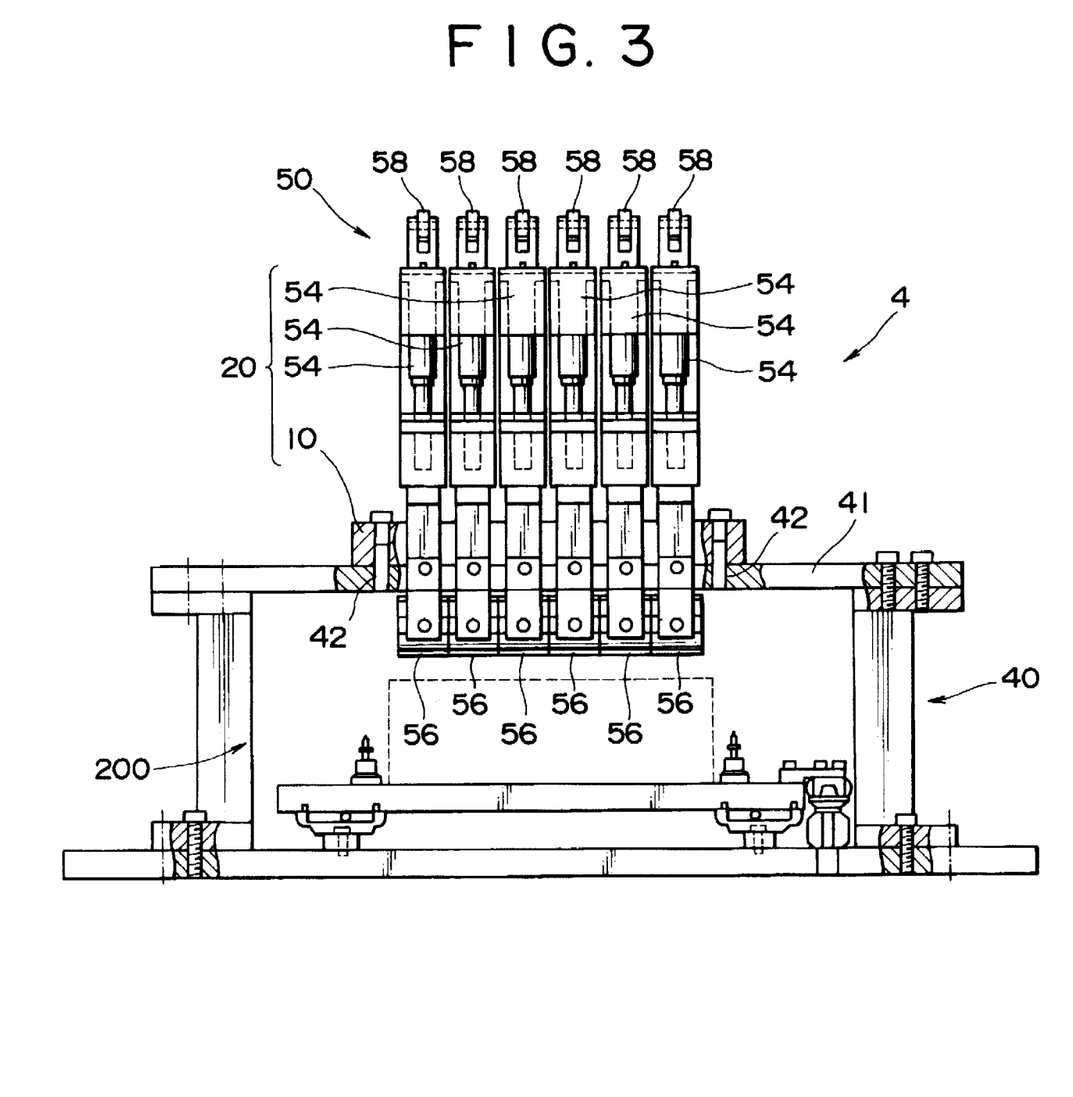
FIG. 3 is a front view of the thermocompression bonding equipment.
Figure 4:
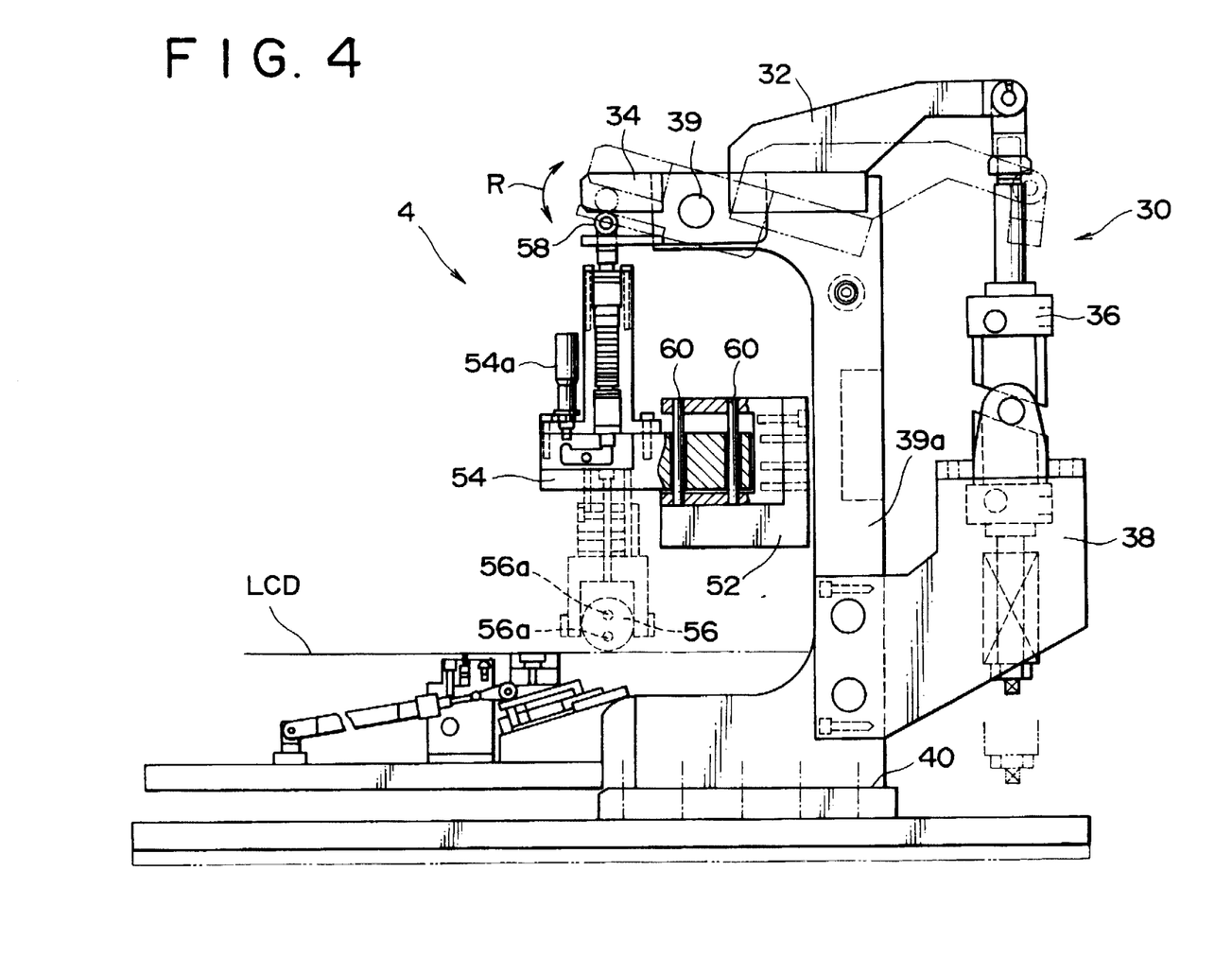
FIG. 4 is a side view of the thermocompression bonding equipment.

The thermocompression bonding unit 4 in FIG. 4 is illustrated in detail in FIG. 2 and FIG. 3.

FIG. 2 is a perspective view for illustrating the structure of the thermocompression bonding unit 4 in detail, FIG. 3 is a front view of the thermocompression bonding unit 4, and FIG. 4 is a side view of the thermocompression bonding unit 4.

Referring to FIG. 2, the thermocompression bonding unit 4 is provided with a head unit 20, pressing means 30, and base frame 40.

The head unit 20 is provided independently from the pressing means 30 and the base frame 40. The head unit 20 is provided with a base 10 and a plurality of vertical sliding mechanisms 50.

As shown in FIG. 2, the base 10 is preferably a long member with L-cross section, and referred to differently as head mounting base. The base 10 consists of a vertical portion 11 and bottom portion 12. On the bottom portion, two positioning holes 13 are provided.

Preferable six sliding mechanisms 50 are shown in FIG. 2 and FIG. 3. These six sliding mechanisms 50 have the same structure. Each sliding mechanisms 50 is provided with a support 52, sliding member 54, and thermocompression bonding head 56.

The support 52 is U-shaped or C-shaped, and provided with two axes 60 in the vertical direction in parallel each other for sliding.

The sliding member 54 is provided slidably in the vertical direction along the axes 60. On the top of the sliding member 54, a cam follower 58 is provided rotatably. On the bottom of the sliding member 54, the thermocompression bonding head 56 is provided. In the thermocompression bonding head 56, a heater 56a is built in.

A load adjusting screw 54a is provided to the sliding member 54 as shown in FIG. 2 and FIG. 4. By adjusting the load adjusting screw 54a, the pressing force of the thermocompression bonding head 56 onto a TAB terminal is adjustable.

Each support 52 of the vertical sliding mechanisms 50 is fixed to the base 10, each sliding mechanism 50 is mounted on the base 10 with a certain pitch along the longitudinal direction.

Referring to FIG. 3 and FIG. 4, the base frame 40 is positioned corresponding to the position of the final compression bonding unit 200. The base frame 40 is provided with the base plate 41. Guide pins 42 are provided upwardly on the base plate 41 as shown in FIG. 2. The positioning holes 13 of the base 10 are to be engaged to the guide pins 42. Therefore, the base plate 41, guide pins 42, and positioning holes 13 constitute positioning means.

By providing the above mentioned structure, the head units 20 are positioned consistently on a prescribed position of the base frame 40.

Referring to FIG. 2 and FIG. 4, the pressing means 30 is described.

The pressing means 30 are also referred to as the pressing unit, and the pressing means 30 are independent from the head unit 20 as described hereinbefore. Pressing means 30 is provided with arms 32, pressing members 34, pressing cylinders 36, and supporting members 38.

The supporting members 38 are fixed to the base frame 40. The bottom ends of the pressing cylinders 36 are mounted on the supporting members 38, and the rods of the pressing cylinders 36 are connected to the ends of arms 32. The arms 32 are fixed to the pressing members 34. The pressing members 34 are mounted on the axis 39 of the supporting frames 39a.

By actuating the pressing cylinders 36, the arms 32 are swung in the direction of an arrow R as shown in continuous line and dotted line. The pressing members 34 are rotated in the direction of the arrow R by distance of a certain stroke.

The pressing members 34 are in contact with cam followers 58 of the vertical sliding mechanisms 50 as shown in FIG. 2 and FIG. 4. The cam followers 58 are pressed to the pressing members 34 by pressing means such as a spring. The spring force is adjustable by adjusting the adjusting screws 54a.

Figure 7:
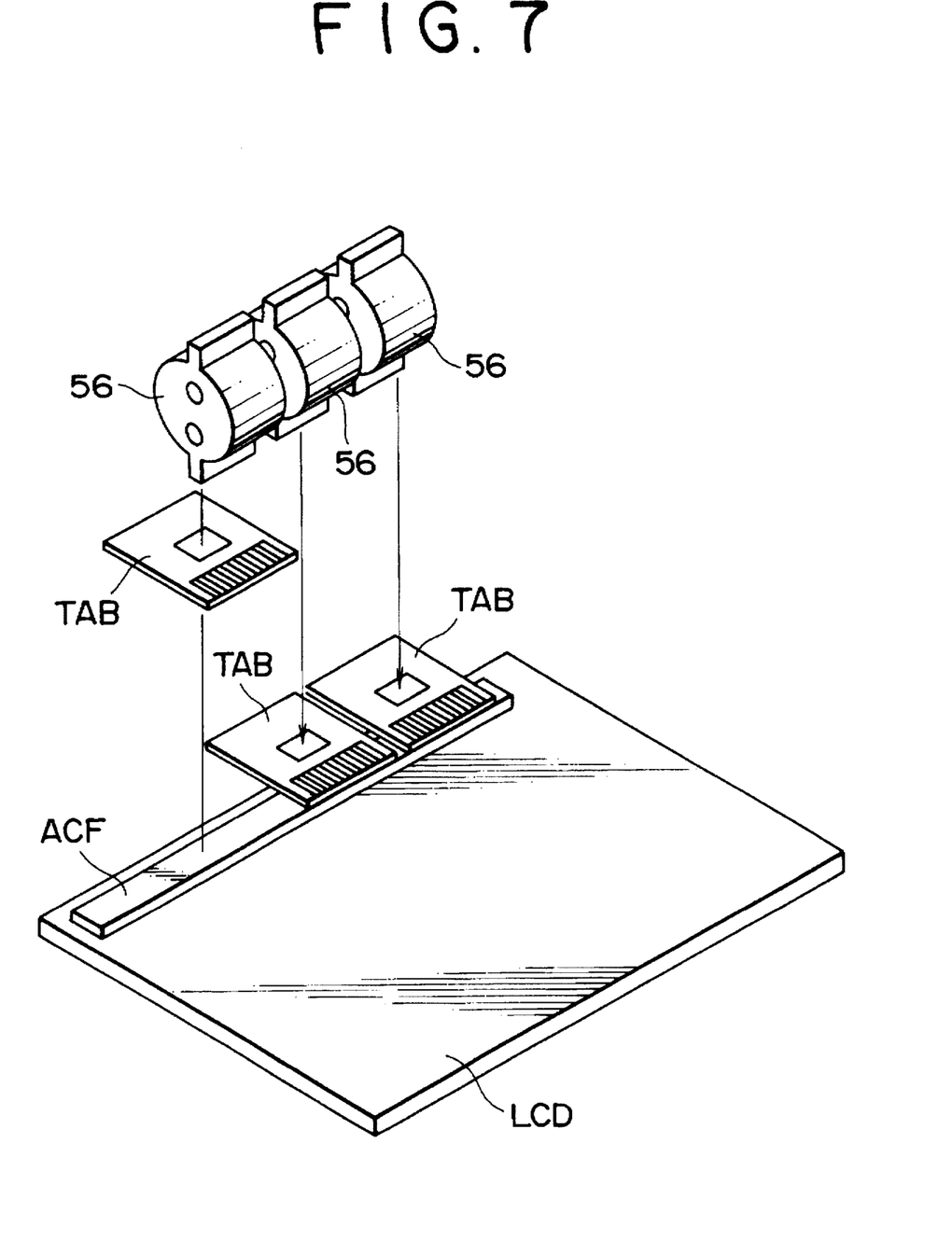
FIG. 7 is a perspective view for illustrating one example of compression bonding heads of the thermocompression bonding equipment in accordance with the present invention, TAB terminal and anisotropic conductive film, and liquid crystal panel.
Figure 8:
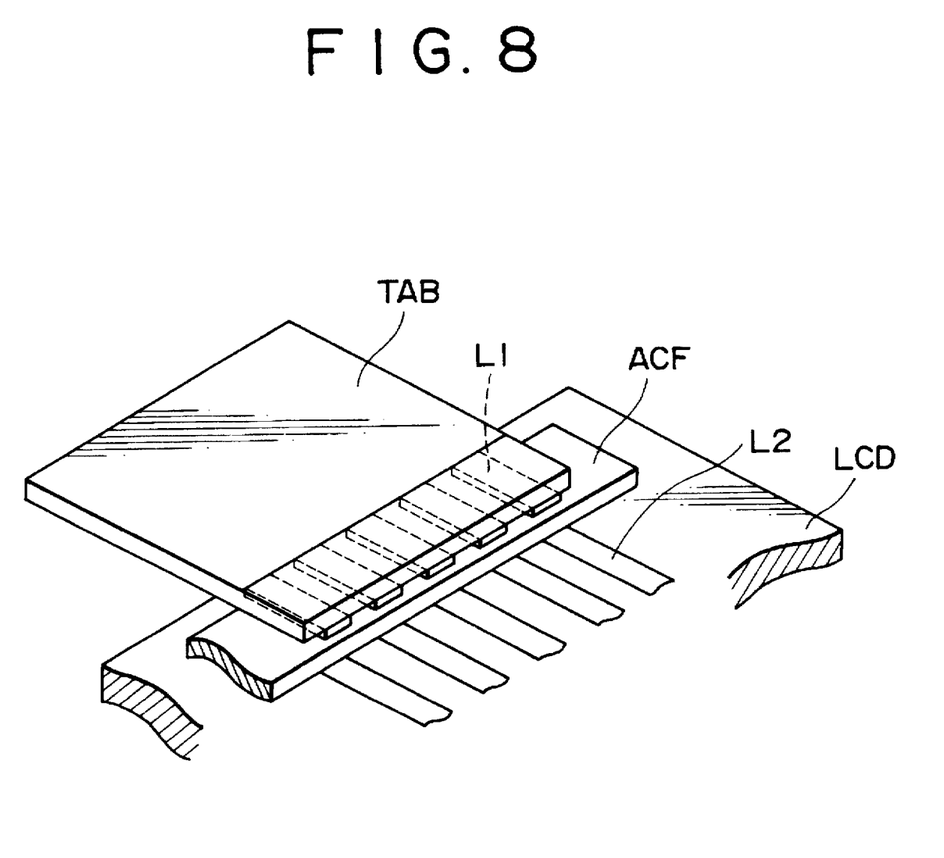
FIG. 8 is a view for illustrating electric connection between electrodes of a TAB terminal and electrodes of a liquid crystal panel.

The thermocompression bonding head 56 and material to be thermocompression-bonded by the thermocompression bonding head 56 are described referring to FIG. 7 and FIG. 8.

Three thermocompression bonding heads are provided side by side in FIG. 7. TAB terminals to be bonded on one side of a liquid crystal panel LCD are different in number and shape depending on the type of the liquid crystal panel LCD to be manufactured.

Therefore, corresponding to the number and shape of TAB terminals to be bonded, the type and number of the thermocompression bonding head 56 must be selected properly.

One example of thermocompression bonding heads 56, TAB terminals TAB, an isotropic conductive film ACF, and a liquid crystal panel LCD is shown in FIG. 7.

The TAB terminals TAB are thermocompression-bonded on the liquid crystal panel LCD spaced with the anisotropic conductive film ACF.

As shown in FIG. 8, the electrodes L1 of the TAB terminal TAB and the electrodes L2 of the liquid crystal terminal LCD are connected with the anisotropic conductive film ACF. The electrodes L1 and electrodes L2 are provided in parallel with the same interval. As described hereinabove, electrodes L1 and electrodes L2, which are facing electrodes L1, are electrically connected.

An example of action of the thermocompression bonding equipment 4 shown in FIG. 3 to FIG. 4 is described herein under.

A plurality of TAB terminals TAB are provided side by side on a liquid crystal panel LCD with spacing of an anisotropic conductive film ACF as shown in FIG. 4 and FIG. 7.

The pressing cylinders 36 are actuated to lift up the rod vertically as shown in FIG. 4. Thereby, the arms 32 and pressing members 34 are rotated round the axis 39 to apply a force F on sliding members 54 in FIG. 2 through the cam followers 58 of each sliding mechanism 50.

The thermocompression bonding heads 56 of the vertical sliding mechanisms 50 thermocompression-bond the TAB terminals TAB on the liquid crystal panel LCD as shown in FIG. 7, and the electrodes L1 of the TAB terminals TAB are electrically connected to the electrodes L2 of the liquid crystal panel LCD with the anisotropic conductive film ACF as shown in FIG. 8.

After the completion of thermocompression bonding, the rods of the pressing cylinders 36 are back-stroked to return the sliding members 54 in FIG. 2 upward to the original position.

In the case that different type and number of TAB terminals TAB are to be thermocompression-bonded on another type of liquid crystal panel different from the current liquid crystal panel LCD in FIG. 7, another head unit 20 different from that in FIG. 2 must be used on the base frame 40.

In this case, the head unit 20 comprising combinedly the base 10 and six sliding mechanisms 50 is taken down from the base frame 40, and another head unit 20 is positioned by the guide pins 42. By replacing a head unit 20 as described herein above, when the type of a liquid crystal panel and the shape of TAB terminals are to be changed, another type of head unit corresponding to the change is consistently positioned on the base frame 40.

The pressing unit 30 is structured independently from the head unit 20, and when the head unit 20 is to be replaced, the only operation required is to back-stroked the rods of the pressing cylinders 36 to separate the pressing members 34 from the cam followers 58 of the vertical sliding mechanisms 50.

A head unit 20 is replaced very easily, and the replaced head unit 20 is easily and consistently positioned on the base frame 40 by aid of the guide pins 42 of the positioning means.

Another embodiment different from the embodiment in FIG. 2 to FIG. 4 is described hereinafter referring to FIG. 5 and FIG. 6.

Figure 5:
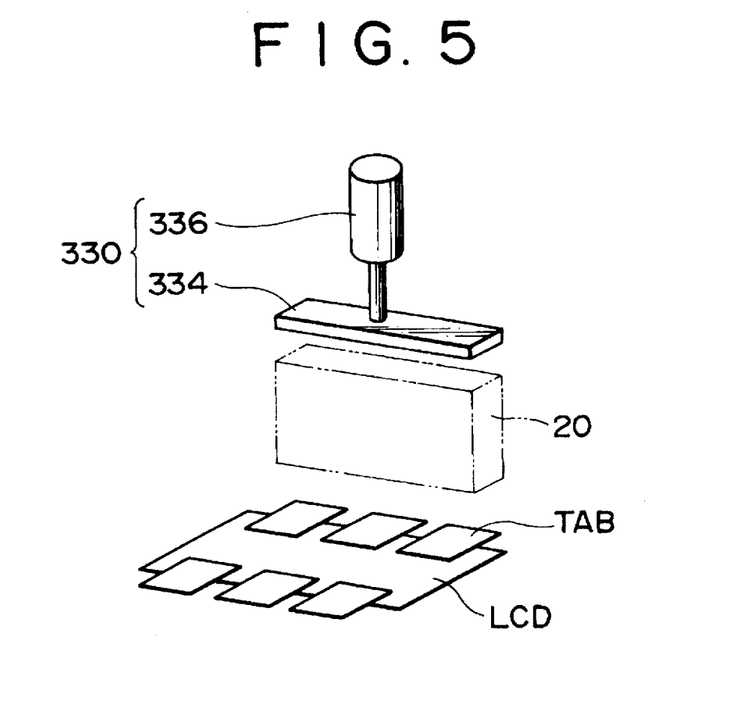
FIG. 5 is a view for illustrating another embodiment of the thermocompression bonding equipment in accordance with the present invention.

In the embodiment in FIG. 5, the pressing means 330 is provided with the pressing cylinder 336 and pressing member 334. The pressing member 334 is a member to press the pressing unit 20, and the pressing unit 20 is structured independently from the pressing member 334.

Figure 6:
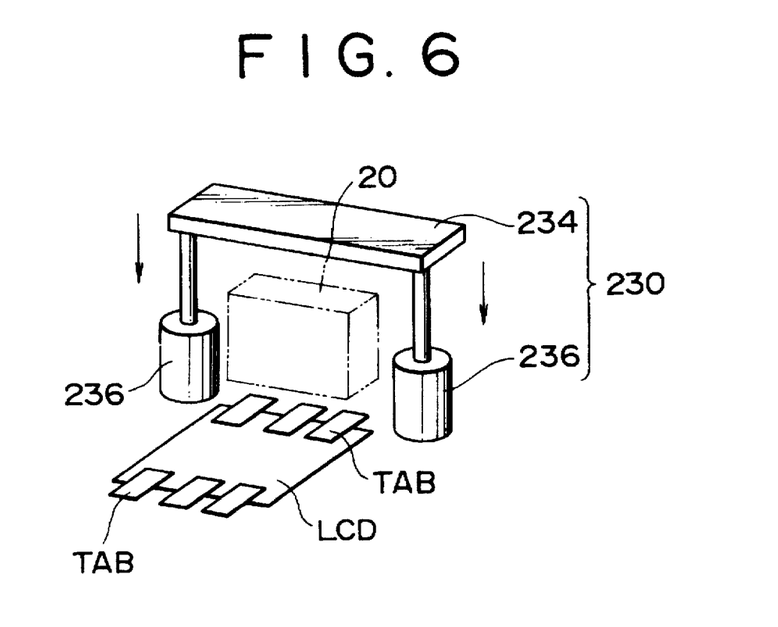
FIG. 6 is a view for illustrating another embodiment of the thermocompression bonding equipment in accordance with the present invention.

In the embodiment in FIG. 6, the pressing means 230 has two pressing cylinders 236 and pressing member 234. By actuating two pressing cylinders 236, the pressing member 234, also referred to as 1 bar is pressed to the head unit 20. Thereby, TAB terminals TAB are thermocompression-bonded on the liquid crystal panel with the anisotropic conductive film.

Figure 9:
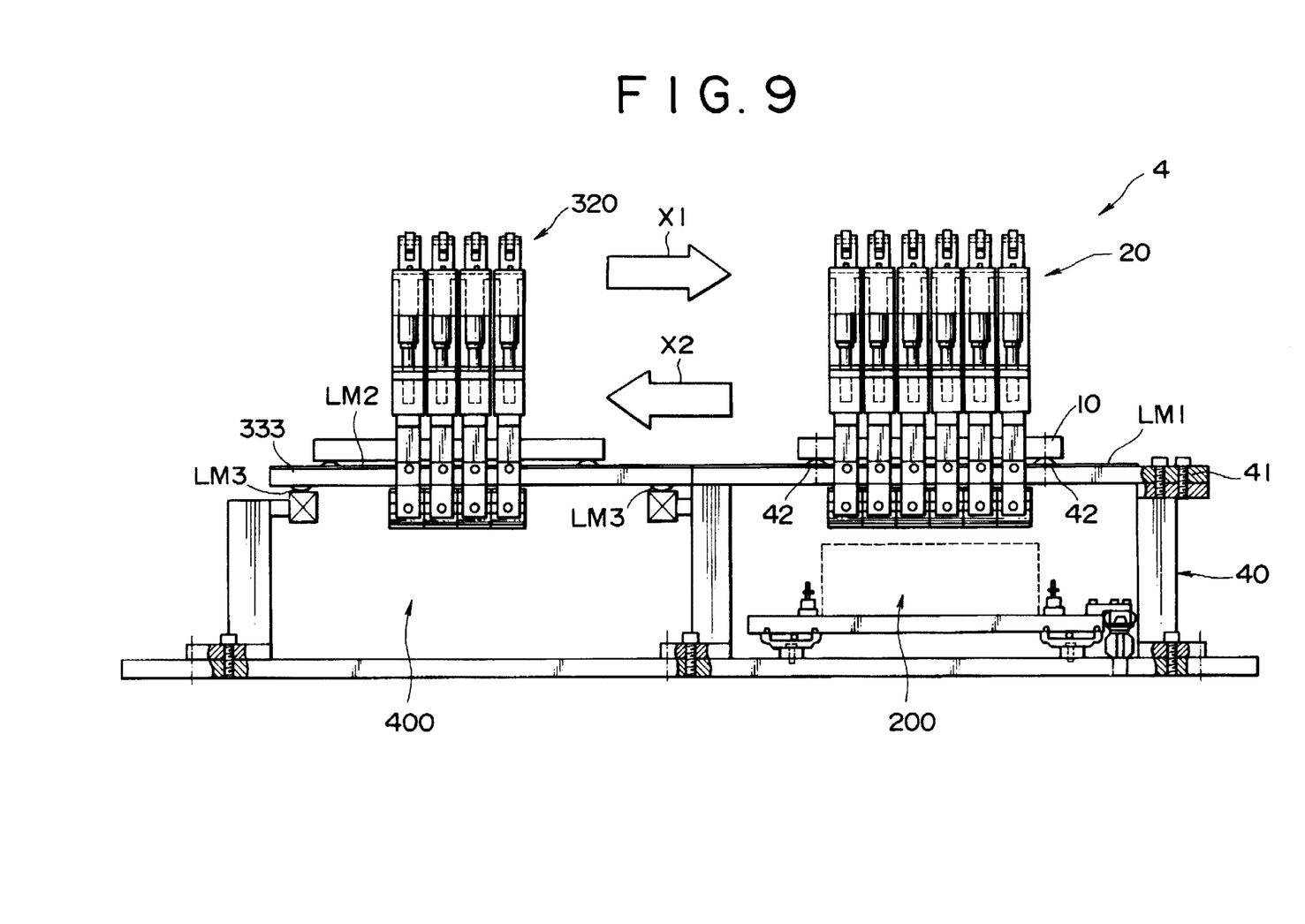
FIG. 9 is a front view for illustrating an embodiment of a thermocompression bonding equipment provided with waiting means.
Figure 10:
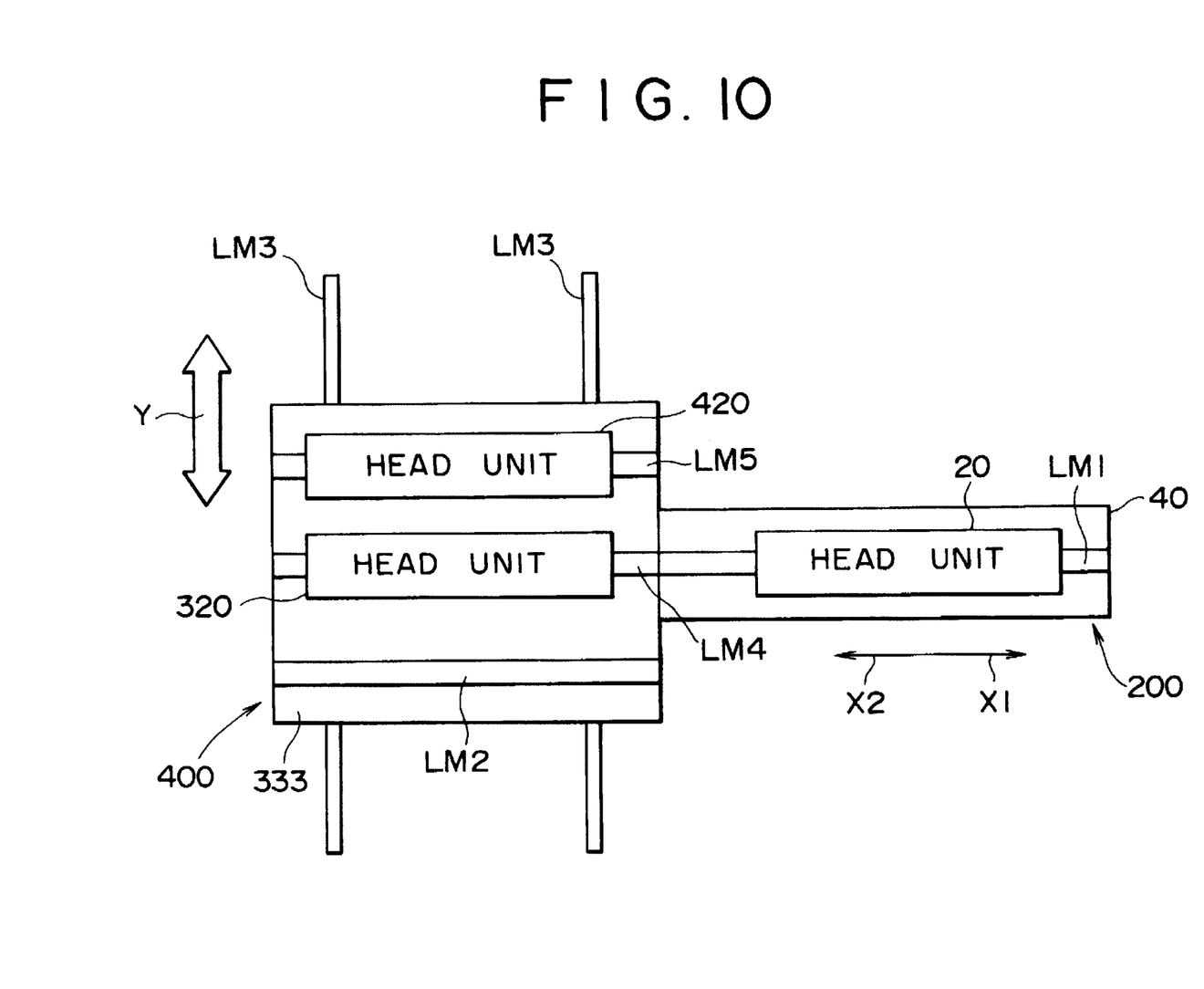
FIG. 10 is a plain view of the thermocompression bonding equipment in FIG. 9.

FIG. 9 and FIG. 10 are referred to hereinafter.

The embodiment in FIG. 9 and FIG. 10 adds the waiting means 400 to the thermocompression bonding equipment 4 shown in FIG. 2 to FIG. 4. The thermocompression bonding equipment 4 is provided above the final compression bonding unit 200, while the waiting means 400 is provided on the side of the final compression bonding unit 200.

On the waiting means 400, the head unit 320 and head unit 420 are waiting for use. On the base frame 40, the head unit 20 is already provided in the place of position as described above.

A linear motor guide LM1 is provided on the base frame 41. Linear motor guides LM3 are provided as shown in FIG.

10. The table 333 moved by the linear motor guides LM3 is movable in the direction of the arrow Y along the linear motor guides LM3.

Three linear motor guides LM3, LM4, and LM5 are provided on the table 333.

In the case of the example shown in FIG. 10, no head unit is provided on the linear motor guide LM2. The head units 320 and 420 are provided on the linear motor guides LM4 and LM5 respectively.

In FIG. 9 and FIG. 10, replacing operation of three head units 20, 320 and 420 is described herein under.

By actuating the linear motor guides LM3, the table 333 is moved to the direction of the arrow Y. The vacant linear motor guide LM2 is position to the linear motor guide LM1. The linear motor guide LM1 is actuated to move the head unit 20 in the direction of the arrow X2 and the head unit 20 is transferred to the linear motor guide LM2.

Then, a required head unit 420 is moved in the direction of X1 and the head unit 420 is transferred on the linear motor guide LM1. In detail, the linear motor guide LM3 is actuated to move the table 333 in the direction of the arrow Y. Thereby, the linear motor guide LM5 is coincided with the linear motor guide LM1. The linear motor guide LM5 is actuated to transfer the head unit 420 to the linear motor guide LM1 side and set the head unit 420 on the vacant liner motor guide LM1. Using the guide pins 42, the new head unit 420 is positioned at the place on the base frame 40.

As described hereinbefore, when the type of crystal panel LCD to be thermocompression-bonded and the type and number of TAB terminals TAB changes, by using the above mentioned replacing system, a required head unit is transferred and positioned on the base frame 40.

Figure 11:
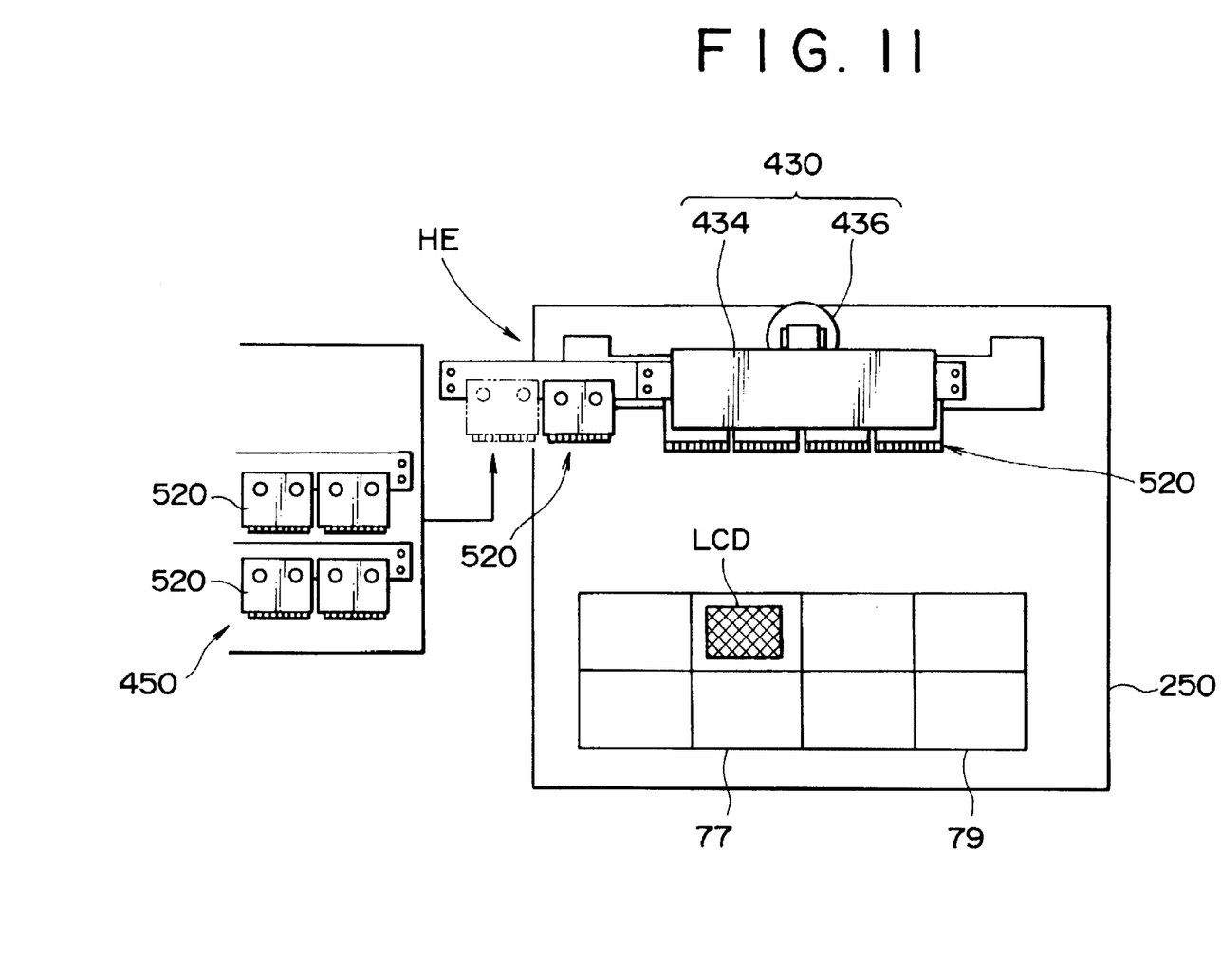
FIG. 11 is a plain view for illustrating an embodiment of another thermocompression bonding equipment in accordance with the present invention.

An embodiment in FIG. 11 is described hereinafter.

A panel area is provided on a base frame 250. A LCD table 77 is provided on the panel area 79. A plurality of liquid crystal panels LCD are placed on the LCD table.

Head units 520 and pressing means 430 are provided facing to the LDC table 77. The pressing means 430 is provided with a pressing cylinder 436 and a pressing member 434, also referred to as the clamp unit. On the left side of the pressing member 434, a head replacing place HE is provided. Another temporary compression bonding head 520 is provided on the head replacing place HE.

On the side of the base frame 250, a rack 450 is provided for replacing the head unit. On the rack for replacing the head unit, a plurality of head units 520 for temporary compression bonding are waiting. The rack 450 is, for example, an independent container rack with casters.

One head unit 520 for replacing placed on the rack 450 is transferred along the arrow to the head replacing place HE. Then, the head 520 for temporary compression bonding is positioned under the pressing member 434. Thereby, the head 520 for temporary compression bonding is provided as shown in FIG. 11.

It is preferable to place the head unit on a guide bearing and draw in the side direction to improve the workability for replacing the head unit. It is preferable to coincide the height of the head unit on the container rack with the height of the head unit on the final compression bonding machine and to connect the guide rails for improving the workability for replacing the head unit.

Figure 12:
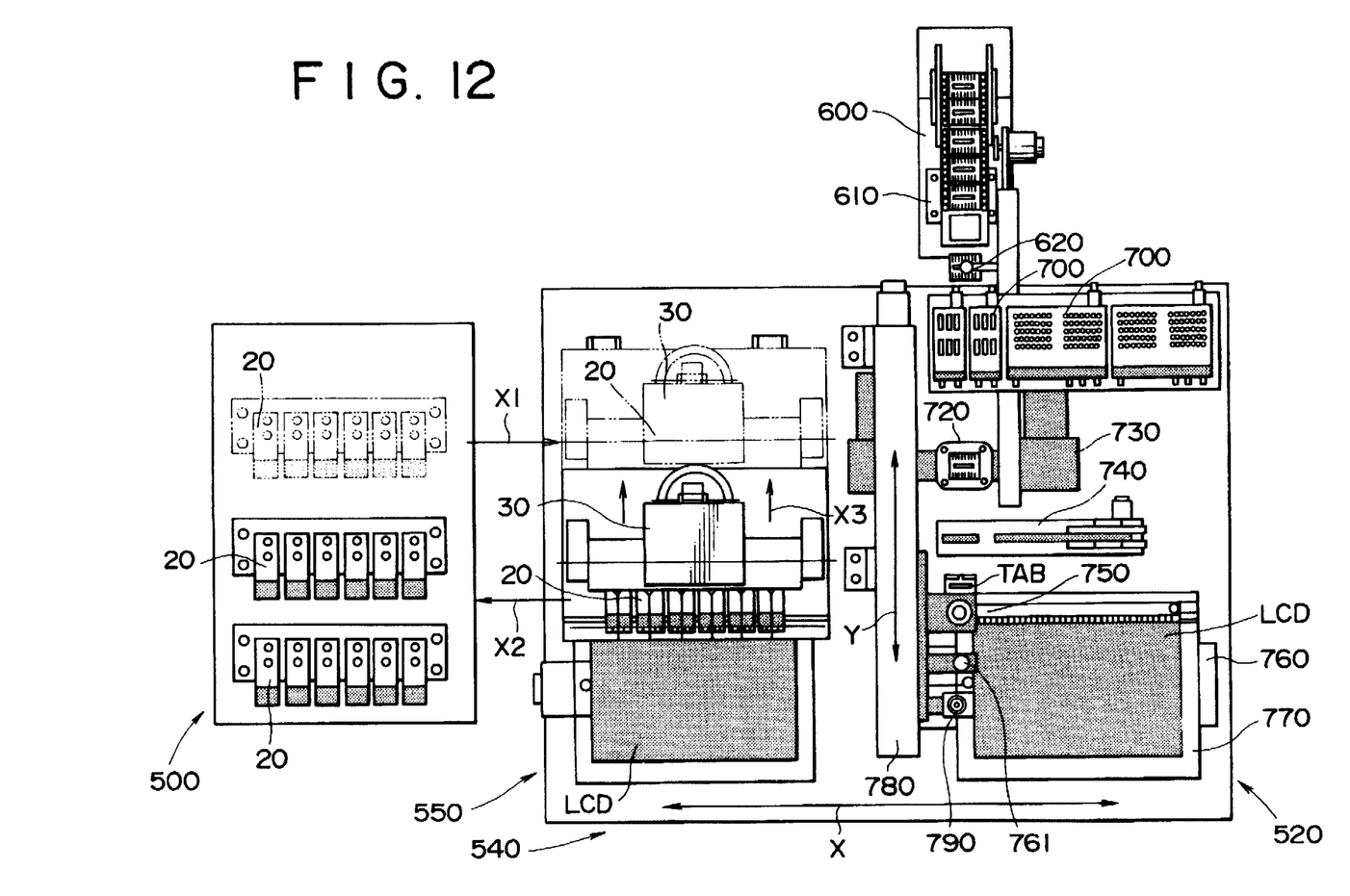
FIG. 12 is a plain view illustrating a further embodiment in accordance with the present invention.

FIG. 12 is referred to hereinafter. In FIG. 12, A frame 550 for the final compression bonding unit and waiting means 500 for replacing a head unit are provided.

The frame 550 is provided with the following elements.

The TAB terminal feeding unit 600 is a unit which feeds many TAB terminals TAB in a form of the tape. The TAB punching die 610 is a die for punching TAB terminal tape to individual TAB terminals TAB.

The image processing light source and monitor 700 are provided for inspecting punched TAB terminals. Punched TAB terminals TAB are fed in the arrow direction by the punched TAB feeding unit 620. The TAB image processing stage 720 is a stage for image processing the shape of TAB terminals TAB. The image of the TAB terminals TAB are processed by the image processing camera 730.

ACF feeding unit 740 is a unit for feeding and cutting anisotropic conductive film ACF to a certain size. The TAB temporary compression bonding unit 750 is a unit for temporary bonding of TAB terminals TAB on a liquid crystal panel LCD. ACF applying unit 761 is an applicator for applying anisotropic conductive film ACF on a liquid crystal panel LCD.

The X-axis robot 760 is a robot for transferring the LCD table 770 in the X-axis direction. The Y-axis robot 780 is a robot for transferring the TAB temporary compression bonding unit 740 and ACF applying unit 761 in the Y-axis direction.

The right portion of the frame 550 is the temporary compression bonding unit 520, and left portion is the final compression bonding unit 540. The head units 20 and pressing means 30 are provided for liquid crystal panel LCD placed on the final compression bonding unit 540.

A plurality of head units 20 are waiting for use on the waiting means 500. A head unit 20 is moved in the direction of the arrow X1 to feed the head unit 30 to the final compression bonding unit 540 side. The used head unit 20 on the final compression bonding unit 540 is moved in the direction of the arrow X2 to transfer it on the waiting means 500.

According to the embodiments described hereinbefore, the type of the liquid crystal panel LCD and the TAB terminals to be bonded are changed, the head unit is easily replaced because the head unit is mechanically and structurally independent from the pressing unit, and the preparation and replacement of the head unit is improved.

The compression bonding condition (flatness adjustment) at each head after replacement of the head unit is consistent. In detail as shown in FIG. 2, head units are positioned by guide pins 42 of the base frame 40, it allows correct positioning and setting such as flatness. Different types of head units previously adjusted to the correct compression bonding condition (flatness adjustment) are prepared for use on the waiting means, a required head unit is selected from the prepared head units and fed easily to the final compression bonding unit or temporary compression bonding unit.

The working time required for replacing the head unit is significantly reduced, and the flexibility of operation of the thermocompression bonding equipment is improved. When the thermocompression bonding head is replaced, the head unit having combinedly the base and vertical sliding mechanisms is replaced altogether, this system is very effective on the production management. The time required for replacing and preparing the compression bonding head is reduced and adjustment of the compression bonding head is simplified.

When the head unit is replaced, the replacing is carried out using linear guides, it allows correct and consistent positioning of the head unit on the base frame 40. Workers need not lift up the head unit for replacement, the workability is good and the working condition is safe, and the replacement can be automated. The time required for replacing the heat unit is shorter than the conventional replacing, it takes, for example, only about 30 seconds.

According to the present invention, when material to be bonded is to be changed, replacing and preparation of the compression bonding head are easy, the time required for replacing and preparation of the compression bonding head is reduced, and adjustment of the compression bonding head is simplified.

What is claimed is:

1. A thermocompression bonding system comprising:
   a head unit comprising a base, a thermocompression bonding head and means for sliding said thermocompression bonding head provided on said base,
   pressing means, which are not fixed to said head unit, for pressing said sliding means to slide said thermocompression bonding head, thereby thermocompression bonding a material to be bonded with said thermocompression bonding head, and
   a base frame provided with positioning means for correctly positioning said head unit when said head unit is placed on said base frame.

2. A thermocompression bonding system as claimed in claim 1, wherein said thermocompression bonding head comprises a plurality of thermocompression bonding heads arranged to match a predetermined pattern of bonds to be made, wherein said plurality of bonding heads all slide simultaneously when pressed by said pressing means.

3. A thermocompression bonding system as claimed in claim 1 or claim 2, wherein said material to be bonded comprises at least one tape automated bonding terminal, electrodes of a liquid crystal panel, and an anisotropic conductive film sandwiched between said at least one tape automated bonding terminal and electrodes.

4. A thermocompression bonding system as claimed in claim 1, wherein said pressing means and said head unit are not physically attached.

5. A thermocompression bonding system as claimed in claim 1, wherein said sliding means comprise at least one cam-follower which is pressed by said pressing unit to cause said sliding means to slide.

6. A thermocompression bonding system as claimed in claim 1, wherein said positioning means comprise at least two guide pins disposed on said base frame which are inserted in guide holes formed in said head unit.

7. A thermocompression bonding system as claimed in claim 2, wherein said head unit comprises means for individually adjusting the pressure exerted by said pressing means on each of said plurality of thermocompression bonding heads.

8. A thermocompression bonding system as claimed in claim 1, wherein said system comprises a plurality of head units.

9. A thermocompression bonding system as claimed in claim 8, wherein said system comprises means for automatically switching a head unit disposed on said base frame for another head unit.

10. A thermocompression bonding system as claimed in claim 9, wherein said system comprises a waiting area where at least one head unit is kept.

11. A thermocompression bonding system as claimed in claim 10, wherein:
    said waiting area comprises a plurality of tracks, each available for storing one of said plurality of head units;
    said base frame comprises a track for moving a head unit between said waiting area and said positioning means; and
    said waiting area moves to alternately align its plurality of tracks with said track for moving a head unit between said waiting area and said positioning means.

* * * * *